(12) United States Patent
Smith et al.

(10) Patent No.: US 6,995,024 B2
(45) Date of Patent: Feb. 7, 2006

(54) METHOD AND APPARATUS FOR ELECTROSTATIC DISPENSING OF MICRODROPLETS

(75) Inventors: Chris D. Smith, Mountain View, CA (US); Pablo E. Garcia, Redwood City, CA (US); Thomas P. Low, Belmont, CA (US); Eric J. Shrader, Belmont, CA (US)

(73) Assignee: SRI International, Menlo Park, CA (US)

( * ) Notice: Subject to any disclaimer, the term of this patent is extended or adjusted under 35 U.S.C. 154(b) by 699 days.

(21) Appl. No.: 09/940,264

(22) Filed: Aug. 27, 2001

(65) Prior Publication Data

US 2003/0049177 A1 Mar. 13, 2003

(51) Int. Cl.
| | |
|---|---|
| *G01N 1/10* | (2006.01) |
| *B01L 3/02* | (2006.01) |
| *B67D 5/22* | (2006.01) |
| *B67D 5/08* | (2006.01) |

(52) U.S. Cl. .................. 436/180; 422/100; 222/57; 222/639

(58) Field of Classification Search ............... 422/100, 422/82.01; 436/180; 222/61, 639; 347/55, 347/57

See application file for complete search history.

(56) References Cited

U.S. PATENT DOCUMENTS

| | | | |
|---|---|---|---|
| 4,341,310 A | | 7/1982 | Sangiovanni et al. |
| 4,700,204 A | * | 10/1987 | Nakayama .................. 347/55 |
| 4,706,098 A | * | 11/1987 | Nakayama .................. 347/9 |
| 4,710,784 A | * | 12/1987 | Nakayama .................. 347/15 |
| 4,801,952 A | * | 1/1989 | Nishikawa et al. .......... 347/55 |
| 4,806,956 A | * | 2/1989 | Nishikawa et al. .......... 347/55 |
| 4,828,146 A | | 5/1989 | Stein |
| 4,864,327 A | * | 9/1989 | Shimosato .................. 347/10 |
| 4,868,585 A | * | 9/1989 | Nishikawa et al. .......... 347/55 |
| 5,223,226 A | | 6/1993 | Wittmer et al. |
| 5,331,159 A | | 7/1994 | Apffel, Jr. et al. |
| RE34,757 E | | 10/1994 | Smith et al. |
| 5,401,963 A | | 3/1995 | Sittler |
| 5,423,964 A | | 6/1995 | Smith et al. |
| 5,486,337 A | | 1/1996 | Ohkawa |
| 5,572,023 A | | 11/1996 | Caprioli |
| 5,652,427 A | | 7/1997 | Whitehouse et al. |
| 5,872,010 A | | 2/1999 | Karger et al. |
| 5,994,696 A | | 11/1999 | Tai et al. |
| 6,001,309 A | | 12/1999 | Gamble et al. |
| 6,043,487 A | | 3/2000 | Waki |

(Continued)

FOREIGN PATENT DOCUMENTS

WO  WO00/62934  10/2000

*Primary Examiner*—Jill Warden
*Assistant Examiner*—Brian R. Gordon
(74) *Attorney, Agent, or Firm*—Perkins Coie LLP (57) ABSTRACT

An apparatus and device for dispensing femtoliter to nanoliter volumes of liquid samples are disclosed. The apparatus includes a liquid-support plate, two electrodes, a substrate, and a control unit. The liquid support plate has a plurality of liquid-support regions, each capable of supporting a liquid meniscus thereon. The first electrode contains a plurality of electrode connections, each operatively connected to one of the liquid support regions, for electrical contact with a meniscus supported in such region. The substrate has a first side confronting the plate and an opposite side, and a plurality of sample-holding regions formed in the first side. The second electrode is disposed adjacent one of the two substrate sides. Thus, a selected volume of the liquid can be ejected from or to one or more of the liquid-support regions to or from one or more of the sample-holding regions.

26 Claims, 10 Drawing Sheets

U.S. PATENT DOCUMENTS

| | | | |
|---|---|---|---|
| 6,080,985 A | 6/2000 | Welkie et al. | |
| 6,090,251 A | 7/2000 | Sundberg et al. | |
| 6,106,685 A * | 8/2000 | McBride et al. | 204/600 |
| 6,114,693 A | 9/2000 | Hirabayashi et al. | |
| 6,121,048 A | 9/2000 | Zaffaroni et al. | |
| 6,123,269 A | 9/2000 | Schmitkons et al. | |
| 6,140,640 A | 10/2000 | Wittmer et al. | |
| 6,149,815 A | 11/2000 | Sauter | |
| 6,154,226 A * | 11/2000 | York et al. | 346/140.1 |
| 6,156,178 A | 12/2000 | Mansfield et al. | |
| 6,231,177 B1 * | 5/2001 | Cherukuri et al. | 347/105 |
| 6,232,129 B1 | 5/2001 | Wiktor | |
| 6,245,227 B1 | 6/2001 | Moon et al. | |
| 6,395,232 B1 * | 5/2002 | McBride | 422/100 |
| 6,444,106 B1 * | 9/2002 | Mcbride et al. | 204/450 |
| 6,485,690 B1 * | 11/2002 | Pfost et al. | 422/102 |
| 6,592,825 B2 * | 7/2003 | Pelc et al. | 422/100 |
| 6,596,239 B2 * | 7/2003 | Williams et al. | 422/100 |
| 6,599,479 B1 * | 7/2003 | Kietzmann et al. | 422/100 |
| 2001/0007460 A1 | 7/2001 | Fujii et al. | |
| 2002/0122099 A1 * | 9/2002 | Furukawa | 347/55 |
| 2002/0130926 A1 * | 9/2002 | Yamada et al. | 347/55 |
| 2003/0148538 A1 * | 8/2003 | Ng | 436/180 |
| 2003/0175163 A1 * | 9/2003 | Shvets et al. | 422/100 |

* cited by examiner

METHOD AND APPARATUS FOR ELECTROSTATIC DISPENSING OF MICRODROPLETS

FIELD OF THE INVENTION

The present invention relates to an apparatus for loading and dispensing small volumes of liquid samples electrostatically, and to methods employing the apparatus.

BACKGROUND OF THE INVENTION

As the sensitivity of analytical techniques continues to improve, it is increasingly desirable to carry out chemical and biochemical reactions and/or analyses using very small volumes of samples and reagents. This is especially true in situations involving expensive substances. Accordingly, it is now popular to utilize very small volumes of such substances laid down as microdroplets on the surface of, or inside, a well or substrate, such as a slide, micro-card, chip or membrane.

Not only is it often desirable to transfer ultra-small volumes of individual samples and reagents in the form of droplets, it is becoming increasingly popular to arrange numerous such microdroplets in close proximity to one another in the form of an array on a substrate. High-density array formats, or microarrays, permit many reactions to be carried out in a highly parallel fashion, saving space, time and money.

Multi-channel micropipette devices are available for laying down several reagent microdroplets at once. Devices of this type typically have 8 or 12 micropipettes, fixed side-by-side in a linear array. Generally, these devices are unsuitable for quickly producing very dense arrays, since only a few microdroplets (usually 8 or 12) can be laid down at a time with such devices. Furthermore, these micropipette devices are typically not capable of dispensing femtoliter volumes of samples. Thus, the production of very dense arrays, e.g., having hundreds or thousands of microdroplets tends to be a very tedious and time-consuming process.

In view of the above, the need is apparent for an apparatus and method useful for dispensing a micro-volume of a substance onto a substrate in a quick and efficient manner. Preferably, the apparatus should be relatively easy to use and readily adaptable. The present invention is designed to meet these needs.

SUMMARY OF THE INVENTION

In one aspect, the invention includes an apparatus for use in dispensing femtoliter to nanoliter volumes of each of a plurality of selected aqueous, organic solvent such as dimethylsulfoxide (DMSO), or aqueous/organic solvent liquid samples. The apparatus includes a liquid-support plate, two electrodes, a substrate, and a control unit. The liquid support plate has a plurality of liquid-support regions, each capable of supporting a liquid meniscus thereon. The first electrode contains a plurality of electrode connections, each operatively connected to one of the liquid support regions, for electrical contact with a meniscus supported in such region. The substrate has a first side confronting the plate and an opposite side, and a plurality of sample-holding regions formed in the first side. The second electrode is disposed adjacent one of the two substrate sides. In one embodiment, the spacing from the plate liquid-support regions and the meniscus is between about 0.1 to 5 mm. In another embodiment, the spacing between the meniscus and the second electrode is between about 1–3 mm.

The control unit includes a power source for applying a voltage potential across the two electrodes. In one embodiment, the voltage potential has a pulse amplitude between 0.1–5 kV, and a selected pulse duration in the range 0.1 to 500 msec. Thus, a selected volume of the liquid, in the femtoliter to nanoliter volume range, can be ejected from or to one or more of the liquid-support regions to or from one or more of the sample-holding regions.

In one preferable embodiment, the control unit is operable to apply a voltage potential with a selected pulse duration between about 1–100 msec across the electrodes. In another preferable embodiment, the voltage potential has a pulse amplitude between about 0.5–3 kV.

The liquid-support plate and substrate of the apparatus can be positioned such that each liquid-support region is in alignment with a corresponding substrate sample region, creating pairs of aligned liquid-support regions and sample regions. The second electrode may include a single electrode region which is relatively movable, with respect to the plate and substrate, to place the electrode region adjacent pairs of aligned liquid-support regions and sample regions, and the control unit is operable to move the successively adjacent aligned pairs of liquid-support regions and sample regions, and to apply said voltage potential pulse at each successive aligned pair. In one embodiment, the second electrode is disposed between said plate and substrate, and defines an electrode gap through which a liquid droplet passes when ejected from a liquid-support region or a sample region. Alternatively, the second electrode includes an electrode plate positioned adjacent the substrate's opposite side, and the control unit is operable to apply a voltage potential to all or a selected one or more of said first-electrode connections.

The apparatus can be fabricated such that the liquid-support plate, second electrode or second electrode carriage, and substrate are all independently movable with respect to the other, under the control of the control unit. In one embodiment, the liquid-support plate and the second-electrode plate are relatively movable, as a unit with respect to the substrate.

The apparatus may have a second electrode that includes an electrode plate having a plurality of electrode gaps adapted to be positioned with respect to the liquid-support plate so as to position each gap in alignment with an associated first-electrode connection. In this embodiment, the control unit is operable, when the second electrode gaps are positioned between corresponding pairs of aligned liquid-support regions and substrate sample regions, to apply such voltage-potential pulse simultaneously to each of the aligned first-electrode connections and second-electrode gaps. Alternatively, the control unit is operable, when the second electrode gaps are positioned between corresponding pairs of aligned liquid-support regions and substrate sample regions, to apply such voltage-potential pulse sequentially to each of the aligned first-electrode connections and second-electrode gaps.

In one embodiment, each sample-holding region in the substrate includes a defined-size hydrophilic region surrounded by a hydrophobic surface area.

For use in picking up a defined volume of sample from each of a plurality of sample wells in the substrate, the liquid-support regions in the liquid-support plate of the apparatus are capillary openings into which a defined volume of sample can be held, forming a meniscus therein, upon application of a voltage potential. The apparatus may further include a pressure device for expelling the liquid in the through holes or capillaries, to deliver the entire meniscus from each through hole or capillary. In another embodiment, the liquid-support regions in the liquid-support plate of the apparatus are studs onto which a defined volume of sample can be held. The studs may be formed of any conductive material.

In another aspect, the invention includes a method of transferring a selected volume, in the femtoliter to nanoliter volume range, of each of a plurality of selected aqueous, organic solvent, or aqueous/organic solvent liquid samples. Initially a liquid sample is added to some or all of the liquid-support regions in the liquid-support plate or some or all of the substrate sample regions in the substrate in the apparatus. The liquid-support plate is then positioned with respect to the substrate so as to align one or more of the plate liquid-support regions with one of more of the substrate sample regions. The second electrode in the apparatus is then placed adjacent one side of the substrate. The spacing of the second electrode from the meniscus is typically about 0.5 to 5 mm. Finally, a voltage potential is applied across the first and second electrodes in the apparatus. The voltage potential commonly has a pulse amplitude between 0.1–5 kV, and a selected pulse duration in the range 0.1 to 500 msec, thereby to eject a selected volume of the liquid, in the femtoliter to nanoliter volume range, from or to one or more of the liquid-support regions to or from one or more of the sample-holding regions.

In one preferable embodiment, the selected pulse duration is between about 1–100 msec. In another preferable embodiment, the second electrode about 1–3 mm from the meniscus or liquid support plate or region. In yet another preferable embodiment, the voltage potential has a pulse amplitude between 0.5–3 kV.

The positioning may be effective to place each liquid-support region in alignment with a corresponding substrate sample region, creating pairs of aligned liquid-support regions and sample regions. In a related embodiment, the second electrode includes a single electrode which is relatively movable, with respect to the plate and substrate, to place the electrode adjacent pairs of aligned liquid-support regions and sample regions, and the placing and applying is effective to move the second electrode successively to adjacent aligned pairs of liquid-support regions and sample regions, and to apply the voltage potential pulse at each successive aligned pair.

In one embodiment, the second electrode is disposed between plate and substrate. In this embodiment, the second electrode defines an electrode gap through which a liquid droplet passes when ejected from a liquid-support region or a sample region. Alternatively, the second electrode includes an electrode plate positioned adjacent the substrate's opposite side, and the applying is operable to apply a voltage potential to all or a selected one or more of the first-electrode connections. The second electrode may include an electrode plate having a plurality of electrode gaps adapted to be positioned with respect to liquid-support plate so as to position each gap in alignment with an associated first-electrode connection. The voltage potential may then be applied to one or more of the first-electrode connections.

For use in picking up or loading a defined volume of sample from each of a plurality of sample wells in the substrate, wherein the liquid-support regions in the liquid-support plate are capillary openings into which a defined volume of sample can be held, the voltage applied is effective to transfer a defined sample volume into each of the liquid support regions, forming a sample meniscus therein. In this embodiment, the sample liquid in the liquid-support region can be further expelled onto a second substrate by applying pressure against the liquid-support plate.

These and other objects and features of the invention will be more fully appreciated when the following detailed description of the invention is read in conjunction with the accompanying figures.

DETAILED DESCRIPTION OF THE INVENTION

I. Sample Dispensing Apparatus

The invention includes, in one aspect, a dispensing apparatus for use in ejecting a selected volume of a sample or fluid. By "sample" is meant a liquid or liquified solution. A sample may be aqueous, contain DMSO or other water miscible organic solvent, or a combination of the two. The properties of the sample or fluid being dispensed contribute significantly to the success of the dispensing apparatus. In particular, electrical conductivity, dielectric constant, and surface tension will affect how the electrostatic forces interact with the sample or fluid. Surface tension will affect how the sample or fluid attaches to the dispensing surface, i.e. affects drop size, and the dielectric constant defines the attractive forces necessary to expel drops, while electrical conductivity affects how charges move within the sample or fluid.

Figure 2:
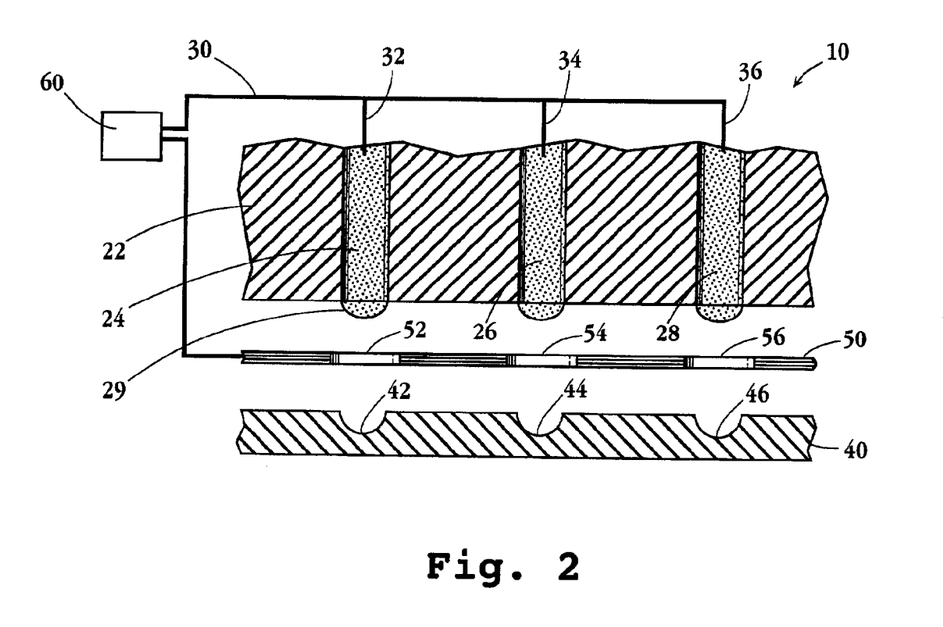
FIG. 2 illustrates one embodiment of an apparatus constructed in accordance with the present invention, for carrying out the transfer method of the invention.
Figure 4:
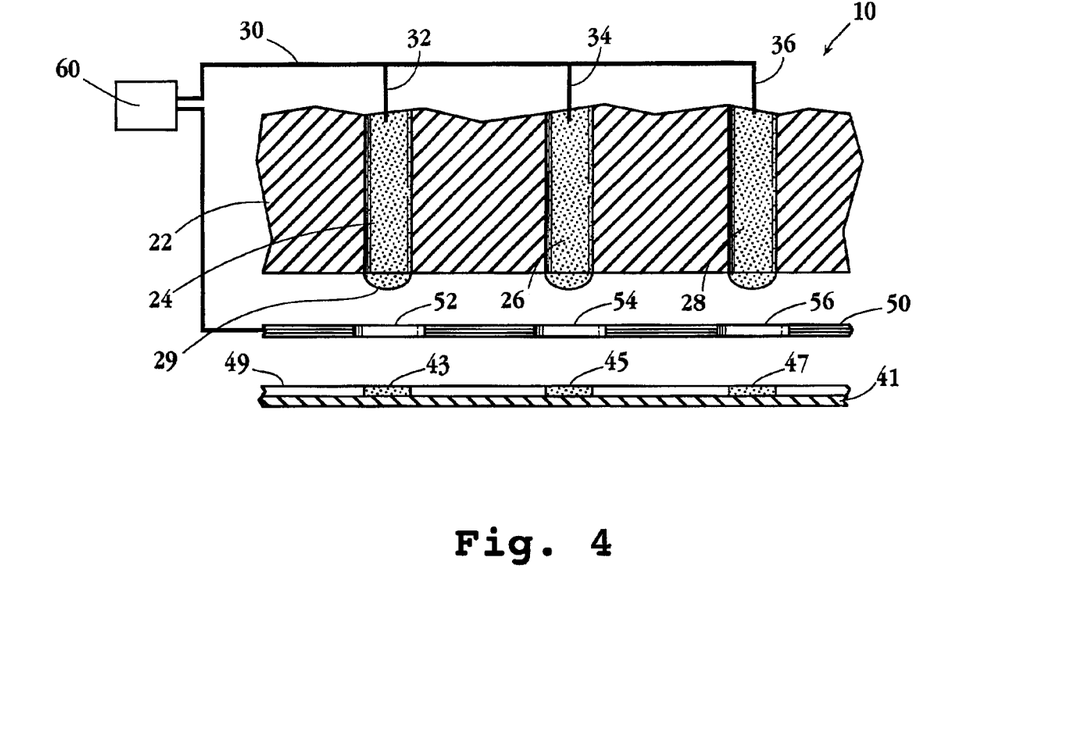
FIG. 4 illustrates one embodiment of an apparatus constructed in accordance with the present invention, for carrying out the transfer method of the invention.

One exemplary apparatus in accordance with the invention is shown at 10 in FIGS. 2 and 4. The apparatus includes a support plate 22 having a plurality of liquid-support regions 24 for carrying out the ejection of a plurality of samples. Each region contains, is adapted to receive, or is operably connected to an electrode connection that is contained in or connected to electrode 30. The electrode and electrode connection may be formed on the substrate or formed separate from the substrate, e.g., on an electrode plate for placement on the substrate for electrode contact with the samples contained in the liquid-support regions. The electrode connections associated with liquid-support regions 24, 26, 28 are indicated at 32, 34, and 36, respectively. Each liquid-support region also supports a liquid meniscus 29. Thus, electrical contact may be made with each meniscus supported in each liquid-support region.

The electrode connections may be provided with a coating that acts as a permeation layer that provides spacing between the metal surface and the liquid sample and allows solvent molecules, small counter-ions, and electrolysis reaction gases to freely pass to and from the metal surface. Electrode coating permeation layers are discussed in U.S. Pat. No. 6,238,624, which is incorporated herein by reference in its entirety.

Referring to FIG. 2, the apparatus also includes a substrate 40 having a plurality of sample-holding regions 42, 44, 46 formed as indented wells in the side that confronts support plate 22. In FIG. 4, the apparatus includes a substrate 41 having a plurality of sample-holding regions 43, 45, 47 which have been treated to provide hydrophilic regions surrounded by a hydrophobic barrier 49. Referring again to FIG. 2, a second electrode 50 is adjacent substrate 40. The second electrode is preferably spaced about 0.1 mm to 5 mm from the meniscus 29. More preferably, the second electrode is spaced between about 1–3 mm from the meniscus. As can be appreciated, the liquid-support plate 22 and the substrate 40 can be positioned with respect to one another to place each liquid-support region 24 in alignment with a corresponding substrate sample region 42 as shown in FIG. 2. Thus, pairs of aligned liquid-support regions and sample regions are created.

The second electrode may be positioned adjacent the substrate's opposite side, and may be a single continuous electrode or may have electrode regions that are adapted to receive, or are operably connected to individual electrode connections. Each of the electrode regions is preferably aligned with the sample-holding regions. Alternatively, the second electrode 50 may include a single electrode region which is relatively movable with respect to support plate 22 and substrate 40. Thus, electrode gap regions 52, 54, 56 can be placed adjacent the pairs of aligned liquid-support regions and sample regions as shown. Each electrode is operatively connected to a control unit, which operates in various modes described below.

Figure 1:
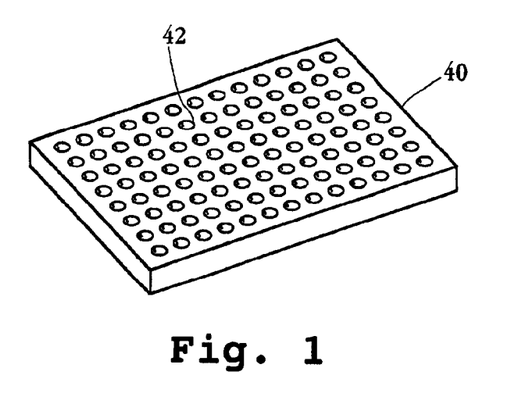
FIG. 1 is a perspective view of a substrate having wells constructed in accordance with one embodiment of the invention.
Figure 3:
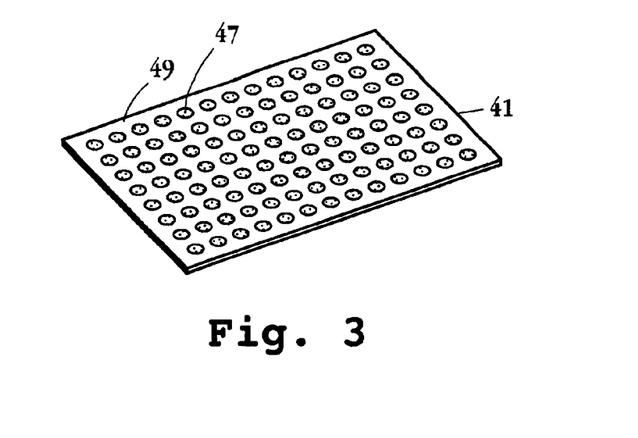
FIG. 3 is a perspective view of a flat substrate constructed in accordance with one embodiment of the invention.

Considering the fabrication of the apparatus, the liquid-support regions and sample-holding regions may be conventionally formed on a support plate or substrate, respectively. In one embodiment not shown in the figures, the liquid support regions on the liquid support plate are hydrophilic regions surrounded by hydrophobic barriers as further described below. Any compatible substrate can be used in conjunction with this invention. The substrate (usually a solid) can be any of a variety of organic or inorganic materials or combinations thereof, including, merely by way of example, plastics such as polypropylene or polystyrene; ceramic; silicon; (fused) silica, quartz or glass, which can have the thickness of, for example, a glass microscope slide or a glass cover slip; paper, such as filter paper; diazotized cellulose; nitrocellulose filters; nylon membrane; or polyacrylamide. The substrate and/or liquid support plate may be treated to provide predefined regions for sample localization, e.g., indented wells as shown in FIGS. 1 and 2, or hydrophilic regions surrounded by hydrophobic barriers as shown for the substrate in FIGS. 3 and 4. Exemplary methods for forming such regions are described in U.S. Pat. No. 5,474,796, which is incorporated by reference in its entirety herein.

Figure 5A:
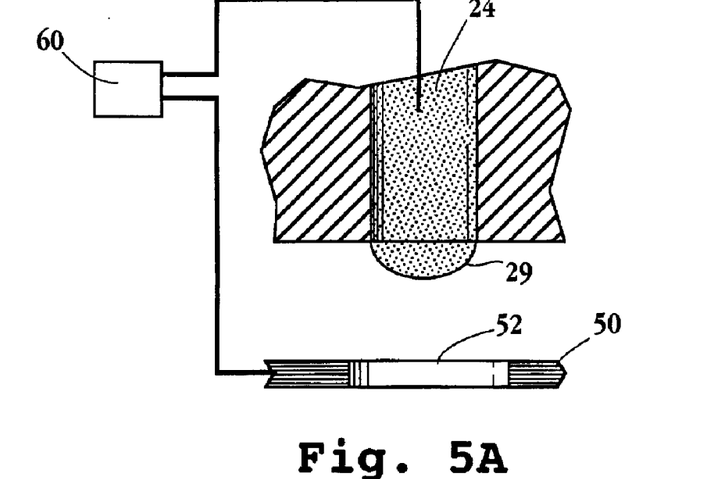
FIGS. 5A–5C illustrate successive steps in ejecting a microdroplet in the method of the invention.
Figure 5B:
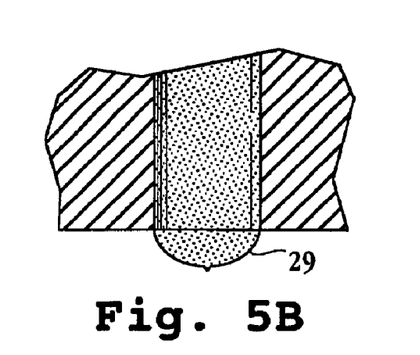
Figure 5C:
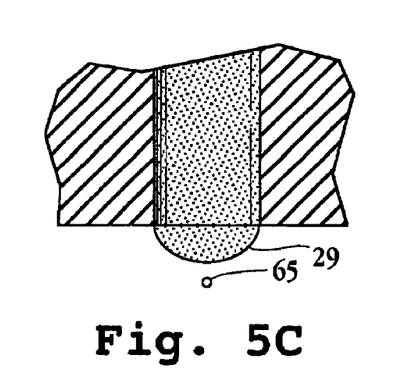

A control unit 60 is attached to two electrodes 30 and 50. The control unit includes a power source for applying a voltage potential and a selected pulse duration. As illustrated in FIGS. 5A–5C, microdroplet 65, which typically has a volume in the femtoliter to nanoliter range, may be transferred from meniscus 29, through electrode gap 52, to a sample holding region (shown in FIGS. 14) by controlling the applied voltage across the two electrodes 30, 50. The voltage potential preferably has a pulse amplitude, or change in pulse amplitude, of between 0.1 kV and 5 kV. More preferably, the pulse amplitude or change in pulse amplitude is between about 0.5 kV and 3 kV. The pulse duration is preferably in the range of 0.1 msec to 500 msec. More preferably, the pulse duration is between about 1–100 msec.

Figure 6:
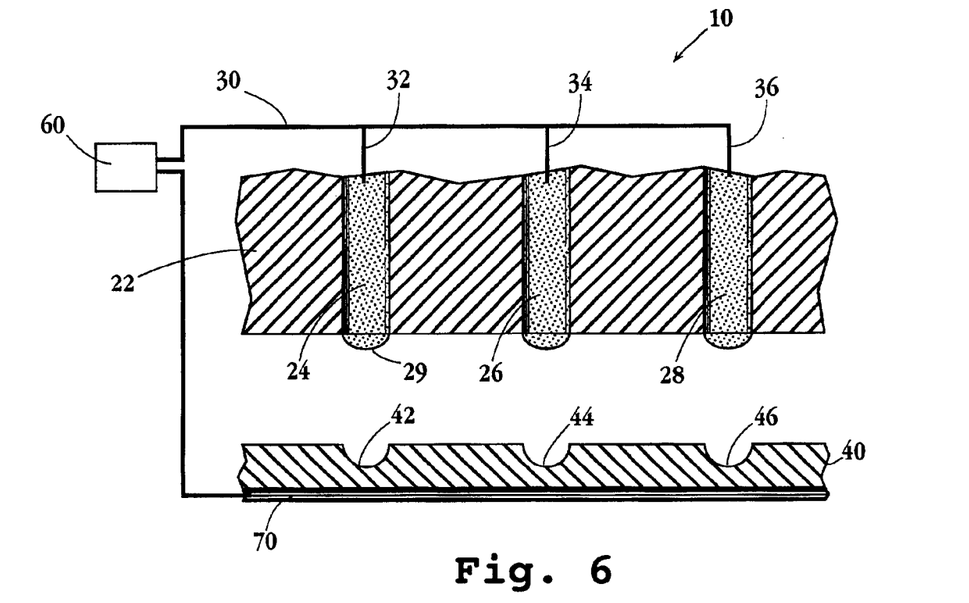
FIG. 6 illustrates an apparatus constructed in accordance with one embodiment of the present invention, for carrying out the transfer method of the invention.

In the embodiments illustrated in FIGS. 2 and 4, the second electrode is disposed between the plate and substrate. Thus, the second electrode may define one or more electrode gaps through which liquid microdroplets pass when ejected from one or more liquid-support regions or sample-holding regions as mentioned above. In another embodiment shown in FIG. 6, the second electrode includes an electrode plate 70 positioned adjacent the opposite side of substrate 40. The control unit 60 can be operable to apply a voltage potential to all or a selected one or more of the first-electrode connections 32, 34, 36.

In one embodiment, the liquid support plate, second electrode, and substrate can all move independently with respect to the other, under the control of the control unit. In another embodiment, the liquid-support plate and the second electrode plate can be relatively movable as a unit, with respect to the substrate.

As illustrated in FIGS. 8A–8C and 9A–9C, liquid-support regions 80, 82, 84 in liquid-support plate 22 may be capillary openings or through holes into which a defined volume of sample can be held, forming a meniscus therein. The apparatus may further include a pressure device (not shown) for expelling the liquid in the through holes or capillaries. The pressure device operates to deliver the entire meniscus, or a portion thereof, from each through hole or capillary. Alternatively, as shown in FIGS. 10A–10C and 11A–11C, liquid-support regions 180, 182, 184 in liquid-support plate 22 may be studs onto which a defined volume of sample may be held, forming a meniscus thereon. The studs may be formed of any conductive material, including metal.

II. Sample Transfer Method

The apparatus described above is designed to carry out the various sample ejection or sample loading operations detailed in subsections A and B below. Generally, the sample transfer method of the invention includes first supplying a sample to the liquid-support regions in the liquid-support plate or to the sample holding regions in the substrate. The sample may be an aqueous liquid, organic solvent such as DMSO, or a combination of aqueous liquid and organic solvent. The sample typically contains multiple biological or biologically active components, such as different-length and sequence DNA fragments, different proteins, or therapeutic compounds or the like, or fluorescent reporter molecules, which are to be analyzed after transfer into the liquid-support regions or sample holding regions.

With the apparatus so loaded, the control unit is operated to align one or more of the liquid-support regions with one or more of the sample holding regions by positioning the liquid-support plate with respect to the substrate. The control unit can also be used to place the second electrode adjacent one side of the substrate, and spaced from the meniscus by about 0.1 mm to 5 mm.

Following positioning of the liquid-support plate and second electrode and substrate, a voltage can be applied across the first and second electrodes, such that a sufficiently high level of energy is reached that the force of surface tension is overcome and individual sample droplets of liquid are ejected from the liquid-support regions. The sample volume ejected is typically in the femtoliter to nanoliter range.

In one embodiment of the invention, a set of conductive pipettes is converted into a dispenser. There are several products in the market that use conductive pipettes to detect the presence of liquid in plates. The method contemplated by the invention would retrofit the existing products, which can dispense only down to 250 nl, to enable them to dispense one or more droplets of between about 1–25 nanoliters, or preferably about 2–10 nanoliters, or more preferably about 2–5 nanoliters in size. A high voltage power supply and firing circuit would be connected to the individual pipettes. A second electrode plate with holes would be positioned under the conductive pipettes, so that each pipette would be placed in front of each hole. By modulating the voltage difference between the pipettes and the electrode plate, small nanoliter droplets would be dispensed from the pipettes.

In the method described in subsection A, the sample is ejected from one or more liquid-support regions to one or more sample holding regions; in subsection B, the sample is first loaded into one or more liquid-support regions from one or more sample holding regions, before being ejected into different sample holding regions as described in subsection A. The two sample transfer modes will now be considered in greater detail.

A. Defined-Volume Sample Ejection

Figure 12A:
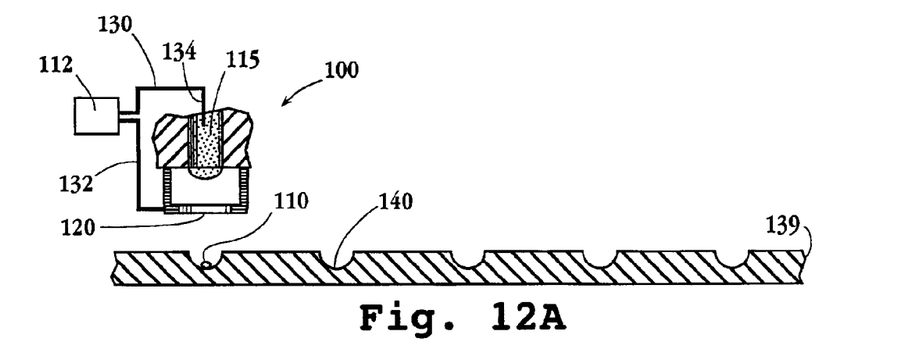
FIGS. 12A–12C illustrate successive steps in ejecting a sample in yet another embodiment of the method of the invention.
Figure 12B:
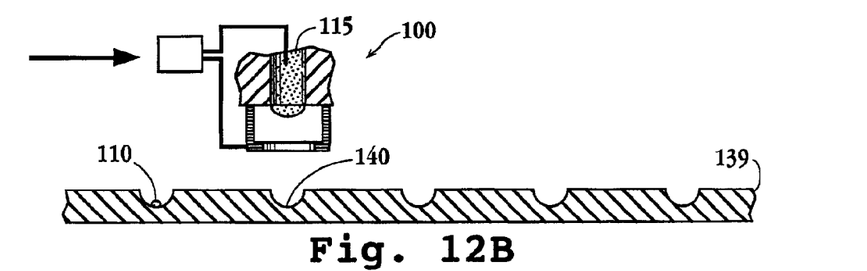
Figure 12C:
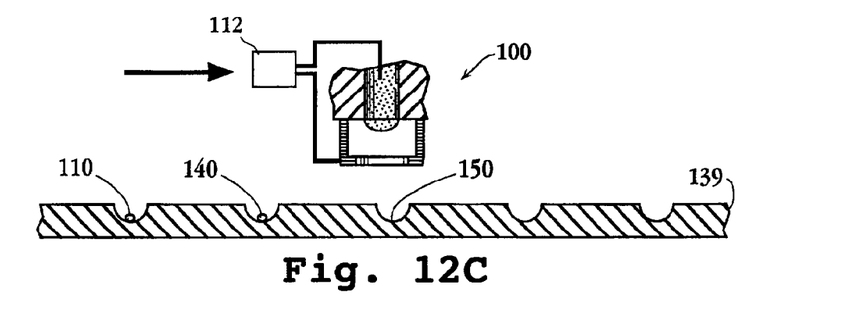

FIGS. 12A–12C illustrate the sample-ejection step in three different configurations, for producing a defined-volume sample droplet. In FIG. 12A, the apparatus 100 is aligned with sample-holding region 110 on substrate 139. As part of the sample-ejection step, control unit 112 operates to apply a voltage potential across the first and second electrodes 130 and 132, respectively, to move a sample droplet from liquid support region 115 through electrode gap 120, and into sample holding region 110. The electrode gap is typically spaced from the meniscus by about 0.1 to 5 mm. Preferably, the electrode gap is 1 to 3 mm from the meniscus. Typically, the voltage potential gradient across the two electrodes has a pulse amplitude of between about 1 to 5 kV, and a pulse duration in the range of 0.1 to 200 msec. Preferably, the pulse duration is between about 1 to 100 msec. As mentioned above, the voltage pulse amplitude and duration are such that the sample droplet transferred is 1 femtoliter to 500 nanoliters. Preferably, the droplet volume is 1 nanoliter to 100 nanoliters.

Figure 7A:
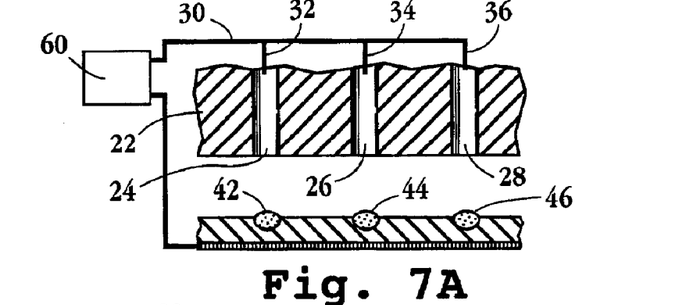
FIGS. 7A–7D illustrate successive steps in loading and ejecting a sample in two embodiments of the method of the invention.

As illustrated in FIG. 12B, apparatus 100 can be moved over sample holding region 140 such that liquid support region 115 is in alignment with region 140. Following alignment, a voltage potential may be applied. The apparatus may be successively moved to adjacent sample holding regions to create an aligned pair of a liquid-support region and a sample region using control unit 112 as shown in FIG. 12C. As illustrated in FIG. 7A, pairs of aligned liquid support regions 24, 26, 28 and sample holding regions 42, 44, 46 may also be created by moving the apparatus in the manner just described. After each pair or pairs of liquid-support regions and sample holding regions have been aligned, the control unit may be used to apply a voltage potential at one or more of the regions as described above.

Figure 7B:
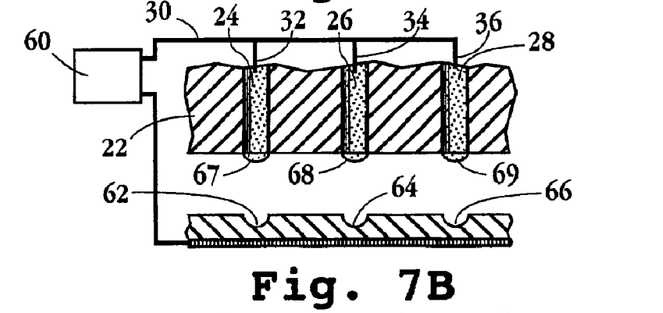
Figure 7C:
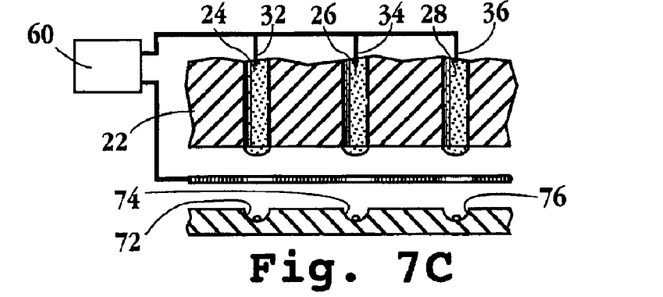
Figure 7D:
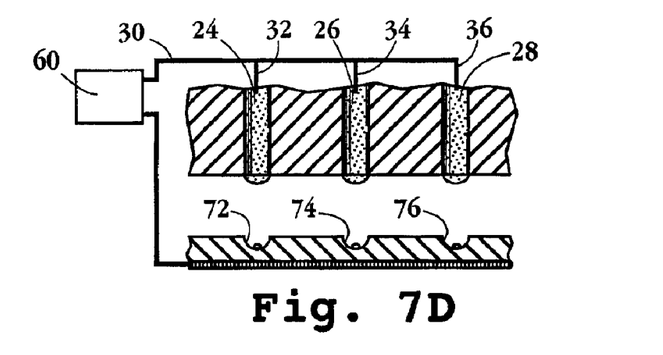

The second electrode may be disposed between the plate and substrate, defining an electrode gap through which a liquid droplet passes when ejected as shown in FIG. 7C. Alternatively, the second electrode may be positioned adjacent the support's opposite side as illustrated in FIGS. 7A, 7B and 7D. A voltage potential may be applied to first-electrode connection 134 shown in FIGS. 12A–12C. Where there exists one or more first-electrode connections 32, 34, 36, as in FIGS. 7A–7D, the voltage potential may be applied to one or more of the first-electrode connections. In one embodiment, the voltage potential is applied to one or more first-electrodes simultaneously. Alternatively, the voltage potential is applied to one or more first or second electrodes sequentially. Thus, individual samples, or blocks or groups of samples may be transferred to or from the liquid-support regions from or to the sample-holding regions in a sequential manner by controlling the voltage potential applied across the first or second electrode connections.

B. Defined-Volume Sample Loading

As indicated above, the apparatus of the invention is also useful for loading one or more samples from a sample-holding region to one or more liquid-support regions. A defined volume may be loaded by electrostatic methods or physically touching the samples, or a combination of both.

B1. Electrostatic Sample Loading

As illustrated in FIGS. 7A and 7B, samples may be loaded into liquid-support regions 24, 26, 28 by electrostatic forces. The sample components in sample-holding regions 42, 44, 46 are drawn into sample holding regions 24, 26, 28, respectively by controlling the voltage applied across each region. A meniscus is formed in each liquid-support region as indicated at 67, 68, 69 in FIG. 7B, from which a microdroplet can be ejected into sample holding regions 72, 74, 76 (FIGS. 7C and 7D), as described above.

B2. Physical Sample Loading

Figure 8A:
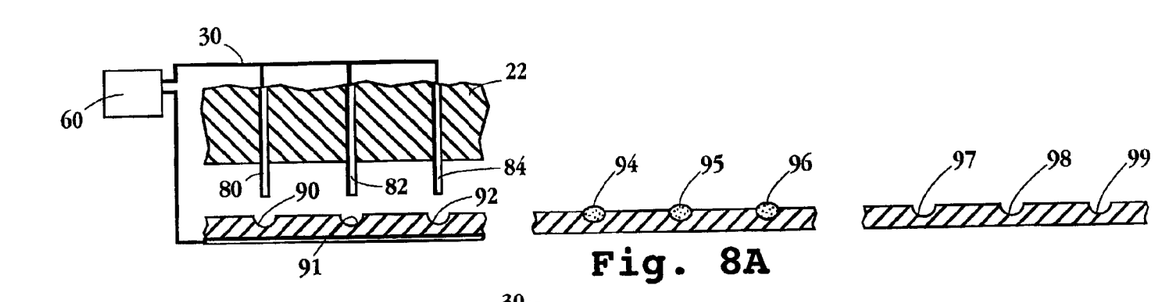
FIGS. 8A–8C, 9A–9C, 10A–10C, and 11A–11C illustrate successive steps in loading and ejecting a sample in several embodiments of the method of the invention.
Figure 8B:
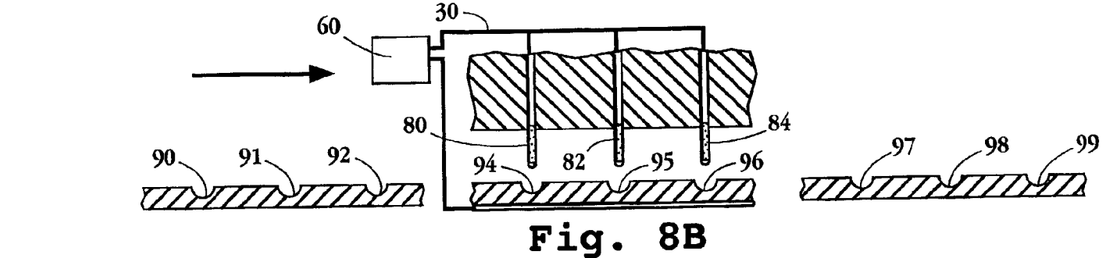
Figure 8C:
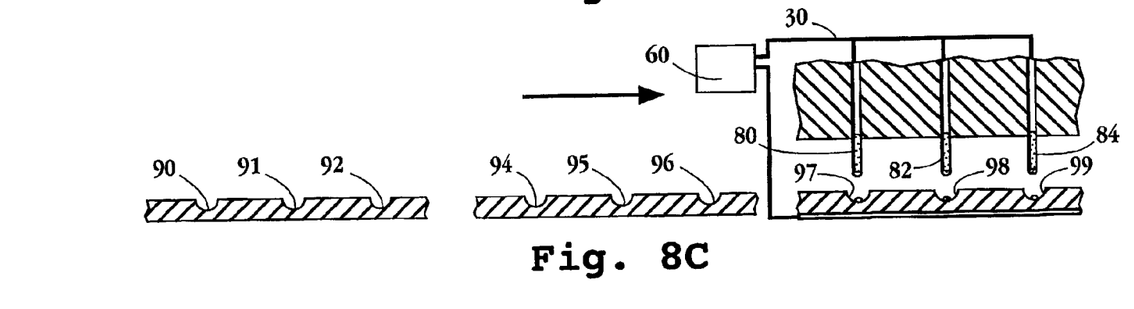
Figure 9A:
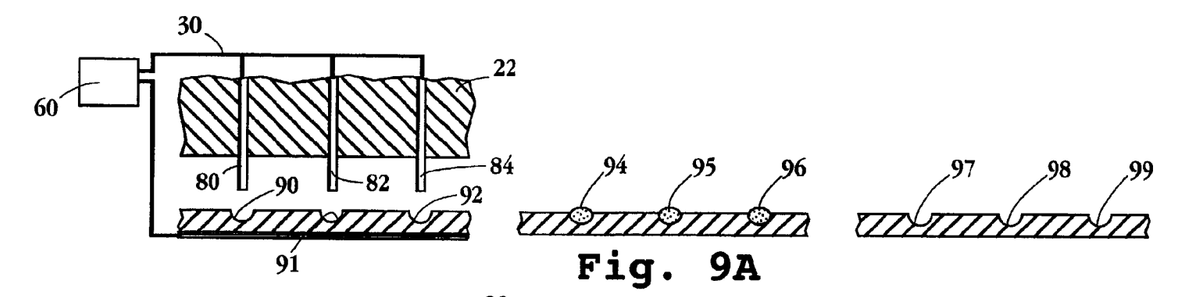
Figure 9B:
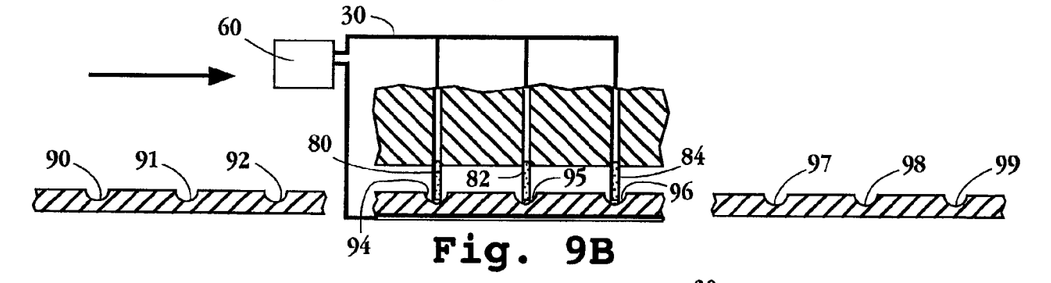
Figure 9C:
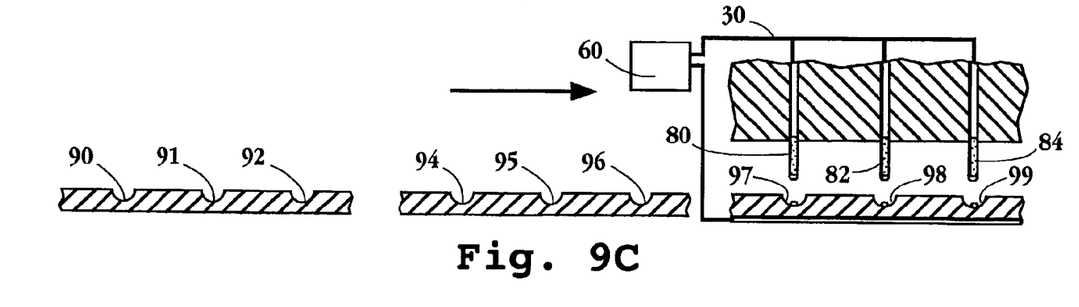

As illustrated in FIGS. 8A–8C and 9A–9C, samples may loaded into liquid-support regions 80, 82, 84 by electrostatic forces (FIGS. 8A–8C), or by capillary action (FIGS. 9A–9C) from sample-holding regions 94, 95, 96. A meniscus is formed in each of the liquid-support regions (FIGS. 8B and 9B). The sample may then be expelled in micro-droplet form, as shown in FIGS. 8C and 9C, into sample holding regions 97, 98, 99 by applying a voltage across each liquid-support region/sample-holding region pair as described above. Alternatively, the samples may be expelled into sample holding regions 97, 98, 99 by applying pressure against the liquid-support plate.

Figure 10A:
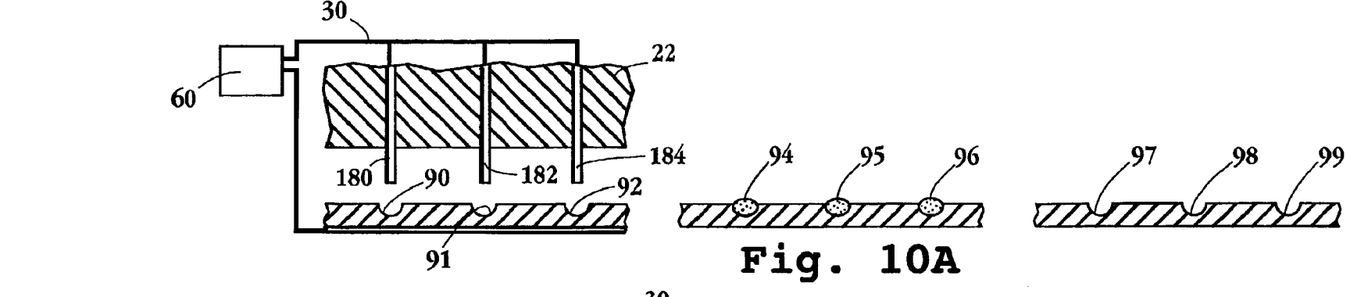
Figure 10B:
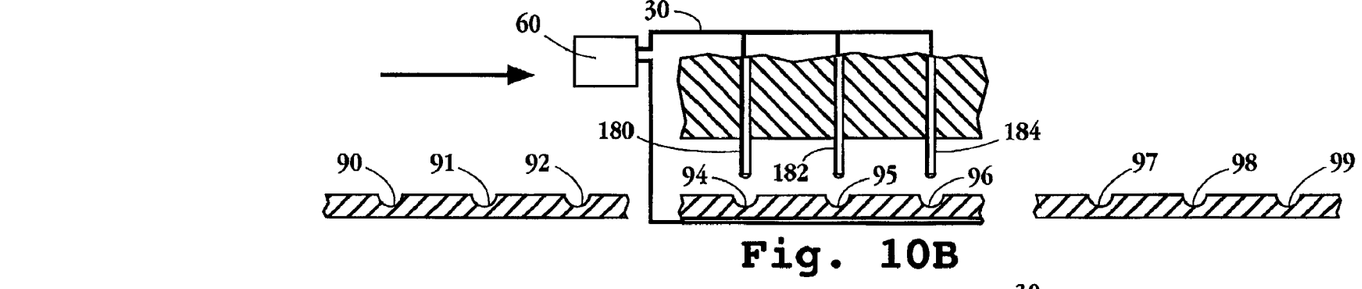
Figure 10C:
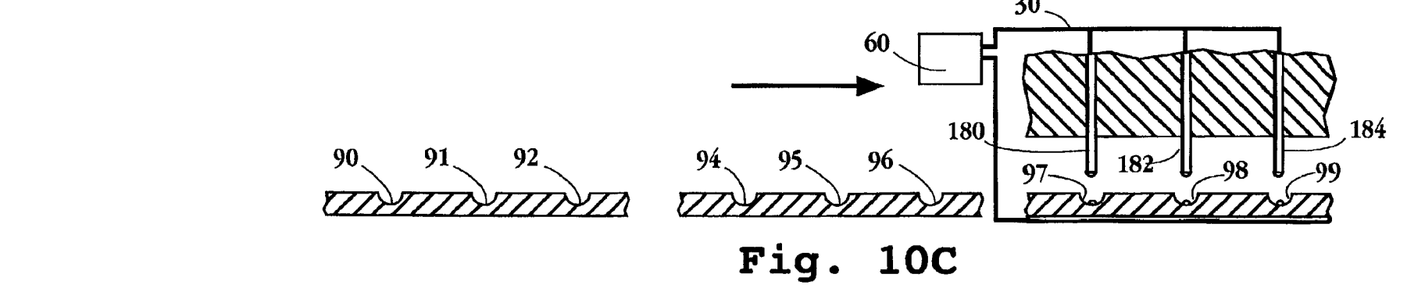
Figure 11A:
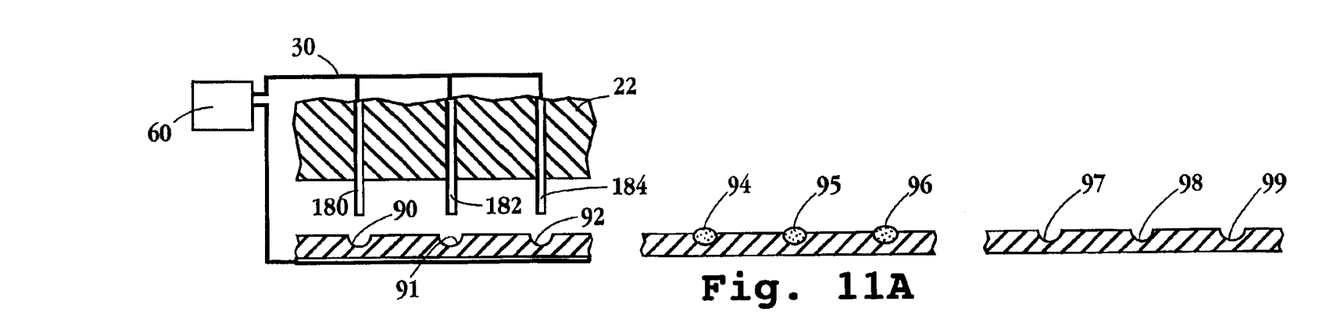
Figure 11B:
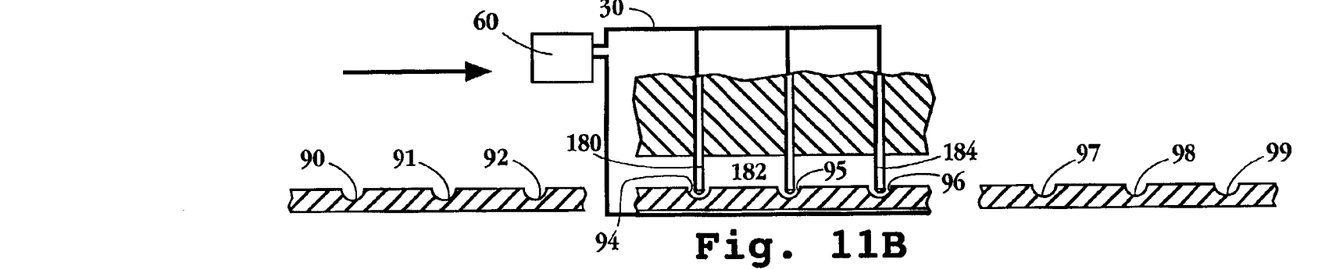
Figure 11C:
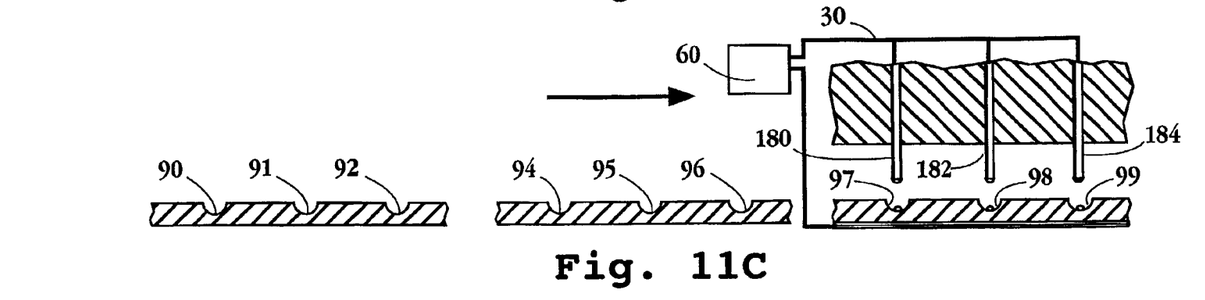

In another embodiment of the invention, as illustrated in FIGS. 10A–10C and 11A–11C, samples may be loaded onto studs 180, 182, 184 by electrostatic forces (FIGS. 10A–10C), or by physically dipping the studs into sample-holding regions 94, 95, 96 (FIGS. 11A–11C). A meniscus is formed on the end of each stud (FIGS. 10B and 11B). The sample may then be expelled in microdroplet form, as shown in FIGS. 10C and 11C, into sample holding regions 97, 98, 99 by applying a voltage across each liquid-support region/sample-holding region pair as described above.

All patent and literature references cited in the present specification are hereby incorporated by reference in their entirety.

The following examples illustrate, but are not intended in any way to limit the invention.

EXAMPLES

Example 1

Table 1 below shows data obtained from experiments performed in support of the present invention. As can be seen from the data, a controlled and defined fluid drop volume may be transferred when various parameters are adjusted. The parameters include the pulse voltage, pulse width/frequency, distance of the second electrode from the meniscus, and fluid composition. When referring to pulse width/frequency in the table, "triangle" means that the voltage was increased from the steady voltage to the sum of the steady and pulse voltages, and when the maximum voltage was measured, the voltage was immediately reduced to the steady voltage. Fluid A is DMSO; fluid B is 0.1% Triton X-100 in 100% DMSO; fluid C is 30% DMSO in 50 mM HEPES; fluid D is 0.1% Triton X-100 in 30% DMSO; and fluid E is 15% DMSO in 50 mM HEPES.

TABLE

| Steady Voltage (kV) | Pulse Voltage (kV) | Pulse Width/Frequency | Distance (mm) | Drop Volume (nl) | Fluid | Maximum Voltage |
|---|---|---|---|---|---|---|
| 1.5 | 1 | 2 s | 1 | 688 ± 18 | A | steady voltage + pulse voltage |
| 1.5 | 1 | 4 s | 1 | 1070 ± 165 | A | steady voltage + pulse voltage |
| 1.5 | 1 | 2 s | 1.5 | 231 ± 51 | A | steady voltage + pulse voltage |
| 1.5 | 1 | triangle | 1.5 | 2.0 ± 0.9 | A | steady voltage + pulse voltage |
| 1 | 1 | 1 s | 1 | 52 ± 7.3 | B | steady voltage + pulse voltage |
| 1 | 1 | triangle | 1 | 5.0 ± 0.8 | B | steady voltage + pulse voltage |
| 1 | 1 | triangle | 1 | 8.8 ± 3.1 | B | steady voltage + pulse voltage |
| 1 | 1 | triangle | 1 | 3.7 ± 1.0 | B | steady voltage + pulse voltage |
| 1 | 1 | triangle | 1 | 1.8 ± 0.5 | C | steady voltage + pulse voltage |
| 1 | 1 | triangle | 1 | 6.8 ± 0.3 | D | steady voltage + pulse voltage |
| 1.7 | 0.8 | 2.38 Hz (50% symmetry; pulse width 800 ms) | 1 | 2.5 ± 0.5 | D | steady voltage + pulse voltage |
| 2.6 | 0.9 | 1 Hz (95% symmetry; pulse width 50 ms) | 1 | 0.4 ± 0.06 | A | steady voltage |
| 2.6 | 0.9 | 1 Hz (95% symmetry; pulse width 50 ms) | 1 | 1.1 ± 0.07 | A | steady voltage |
| 1.2 | 1 | triangle | 1 | 14 ± 5.0 | C | steady voltage + pulse voltage |
| 2.6 | 1 | 0.5 Hz (95% symmetry; pulse width 100 ms) | 1 | 3.3 ± 0.3 | E | steady voltage |
| 2 | 0.7 | 0.5 Hz (0.5% symmetry; pulse width 100 ms) | 1 | 3.6 ± 0.6 | C | steady voltage + pulse voltage |
| 2 | 0.8 | 0.5 Hz (0.5% symmetry; pulse width 100 ms) | 1 | 3.3 ± 0.8 | C | steady voltage + pulse voltage |

From the foregoing, it can be seen how various objects and features of the invention are met. Although the invention has been described with respect to particular embodiments, it will be apparent to those skilled in the art that various changes and modifications can be made without departing from the invention.

What is claimed is:

1. Apparatus for use in dispensing a selected volume of each of a plurality of liquid samples, comprising
   a liquid-support plate having a plurality of liquid-support regions, each capable of supporting a liquid meniscus thereon,
   a first electrode containing a plurality of electrode connections, each operatively connected to one of said liquid support region, for electrical contact with a meniscus supported in such region,
   a substrate having a first side confronting said plate and a plurality of sample-holding regions formed in said first side,
   a second electrode disposed between said liquid-support plate and said substrate, said second electrode defining an electrode gap adapted to accommodate movement of a liquid droplet ejected from a liquid-support region to a sample region, and
   a control unit including a power source for applying a voltage potential across the two electrodes, thereby to eject a selected volume of the liquid from one or more of said liquid-support regions to one or more of said sample-holding regions.

2. The apparatus of claim 1, for use in dispensing a selected volume in the femtoliter to nanoliter volume range, wherein the voltage potential applied across the two electrodes has a pulse amplitude or change in pulse amplitude between 0.1–5 kV, and a selected pulse duration in the range 0.1 to 500 msec.

3. The apparatus of claim 2, wherein said control unit is operable to apply across said first and second electrodes, a voltage potential with a selected pulse duration between about 1–100 msec.

4. The apparatus of claim 1, wherein the spacing between said meniscus and said second electrode is between about 0.1–5 mm.

5. The apparatus of claim 1, wherein said liquid-support plate and substrate can be positioned with respect to one another to place each liquid-support region in alignment with a corresponding substrate sample-holding region, creating pairs of aligned liquid-support regions and sample regions.

6. The apparatus of claim 5, wherein said second electrode includes a single electrode gap which is relatively movable, with respect to said plate and substrate, to place the electrode gap in alignment with pairs of aligned liquid-support regions and sample regions.

7. The apparatus of claim 6, wherein said control unit is operable to move said electrode gap successively to adjacent aligned pairs of liquid-support regions and sample regions, and to apply said voltage potential pulse at each successive aligned pair.

8. The apparatus of claim 5, wherein said liquid-support plate, second electrode and substrate are all independently movable with respect to the other, under the control of said control unit.

9. The apparatus of claim 1, wherein said control unit is operable to apply such voltage potential to said first-electrode connections simultaneously.

10. The apparatus of claim 1, wherein said control unit is operable to apply such voltage potential to said first-electrode connections sequentially.

11. The apparatus of claim 5, wherein said second electrode includes an electrode plate having a plurality of electrode gaps adapted to be positioned with respect to liquid-support plate so as to position each gap in alignment with an associated first-electrode connection.

12. The apparatus of claim 11, wherein said liquid-support plate and said second-electrode plate are relatively movable, as a unit with respect to said substrate.

13. The apparatus of claim 11, wherein said control unit is operable, when the second electrode gaps are positioned between corresponding pairs of aligned liquid-support regions and substrate sample regions, to apply such voltage-potential pulse simultaneously to all or a selected one or more of the aligned first-electrode connections and second-electrode gaps.

14. The apparatus of claim 11, wherein said control unit is operable, when the second electrode gaps are positioned between corresponding pairs of aligned liquid-support regions and substrate sample regions, to apply such voltage-potential pulse sequentially to all or a selected one or more of the aligned first-electrode connections and second-electrode gaps.

15. The apparatus of claim 1, wherein each sample-holding region in said substrate includes a defined-size hydrophilic region surrounded by a hydrophobic surface area.

16. A method of transferring a selected volume of each of a plurality of selected aqueous, organic, or aqueous/organic liquid samples, comprising adding a liquid sample to one or more of the liquid-support regions in the liquid-support plate in the apparatus of claim 1, positioning the liquid-support plate in said apparatus with respect to the substrate so as to align one or more of the plate liquid-support regions with one of more of the substrate sample-holding regions, placing the electrode gap in the second electrode in the apparatus between the liquid-support plate and the substrate, and oppositioned therein to accommodate movement of a liquid droplet ejected from a liquid-support region to a sample-holding region, and applying a voltage potential across the first and second electrodes in the apparatus, thereby to eject a selected volume of the liquid from one or more of said liquid-support regions to one or more of said sample-holding regions.

17. The method of claim 3, wherein said applying is with a selected pulse duration between about 1–100 msec.

18. The method of claim 16, for use in dispensing a selected volume in the femtoliter to nanoliter volume range, wherein the voltage potential applied across the two electrodes has a pulse amplitude or chance in pulse amplitude between 0.1–5 kV, and a selected pulse duration in the range 0.1 to 500 msec.

19. The method of claim 16, wherein said positioning is effective to place each liquid-support region in alignment with a corresponding substrate sample region, creating pairs of aligned liquid-support regions and sample regions.

20. The method of claim 19, wherein the second electrode includes a single electrode gap which is relatively movable, with respect to said plate and substrate, to place the electrode gap adjacent pairs of aligned liquid-support regions and sample regions, and said placing and applying is effective to move the second electrode successively to adjacent aligned pairs of liquid-support regions and sample regions, and to apply said voltage potential pulse at each successive aligned pair.

21. The method of claim 16, wherein said applying is operable to apply a voltage potential to all or a selected one or more of the first-electrode connections.

22. The method of claim 19, wherein said second electrode includes an electrode plate having a plurality of electrode gaps adapted to be positioned with respect to liquid-support plate so as to position each gap in alignment with an associated first-electrode connection, and said applying is effective to apply said voltage potential to a selected one or more of said first-electrode connections.

23. The method of claim 16, wherein said applying is operable to simultaneously eject a sample from one or more of the plurality of liquid-support regions to the corresponding aligned sample-holding region or regions.

24. The method of claim 16, wherein said applying is operable to sequentially eject a sample from one or more of the plurality of liquid-support regions to the corresponding aligned sample-holding region or regions.

25. Apparatus for use in dispensing a selected volume of a liquid onto each of a plurality of regions on a substrate, comprising structure defining a liquid-support region, a first electrode operatively connected to a liquid support region, for electrical contact with a meniscus supported in such region, a second electrode carried on said structure and defining an electrode gap aligned with said liquid-support region to accommodate movement of a liquid droplet ejected from the liquid-support region onto such a substrate, and a control unit including a power source for applying a voltage potential across the two electrodes, thereby to eject a selected volume of the liquid from said liquid-support region onto such a selected region on such a substrate.

26. The apparatus of claim 25, for use in dispensing a selected volume in the femtoliter to nanoliter volume range, wherein the voltage potential applied across the two electrodes has a pulse amplitude or change in pulse amplitude between 0.1–5 kV, and a selected pulse duration in the range 0.1 to 500 msec.

* * * * *